United States Patent
Wang et al.

(10) Patent No.: US 10,519,038 B2
(45) Date of Patent: Dec. 31, 2019

(54) NANOCRYSTAL PREPARATION METHOD, NANOCRYSTALS, AND APPARATUS FOR PREPARING AND STORING DISSOLVED GAS

(71) Applicant: Suzhou Xingshuo Nanotech Co., Ltd., Suzhou, Jiangsu (CN)

(72) Inventors: Yunjun Wang, Jiangsu (CN); Junzuo Wang, Jiangsu (CN)

(73) Assignee: SUZHOU XINGSHUO NANOTECH CO., LTD. (CN)

( * ) Notice: Subject to any disclaimer, the term of this patent is extended or adjusted under 35 U.S.C. 154(b) by 0 days.

(21) Appl. No.: 15/761,524

(22) PCT Filed: Nov. 24, 2015

(86) PCT No.: PCT/CN2015/095369
§ 371 (c)(1),
(2) Date: Mar. 20, 2018

(87) PCT Pub. No.: WO2017/049754
PCT Pub. Date: Mar. 30, 2017

(65) Prior Publication Data
US 2019/0055126 A1 Feb. 21, 2019

(30) Foreign Application Priority Data
Sep. 22, 2015 (CN) .......................... 2015 1 0607472

(51) Int. Cl.
*C01B 19/04* (2006.01)
*C01B 19/00* (2006.01)
(Continued)

(52) U.S. Cl.
CPC .............. *C01B 19/04* (2013.01); *C01B 13/14* (2013.01); *C01B 17/20* (2013.01); *C01B 19/007* (2013.01);
(Continued)

(58) Field of Classification Search
None
See application file for complete search history.

(56) References Cited

U.S. PATENT DOCUMENTS

| 6,872,249 B2 * | 3/2005 | Peng ...................... B82Y 30/00 |
| | | 117/68 |
| 9,517,945 B2 * | 12/2016 | Ito .......................... C01G 51/04 |

(Continued)

FOREIGN PATENT DOCUMENTS

| CN | 1672782 A | 9/2005 |
| CN | 101146871 A | 3/2008 |

(Continued)

OTHER PUBLICATIONS

International Search Report for International Application No. PCT/CN2015/095369 dated Jun. 21, 2015.

*Primary Examiner* — Sheng H Davis
(74) *Attorney, Agent, or Firm* — Kim IP Law Group PLLC

(57) ABSTRACT

A nanocrystal preparation method comprises the following steps: dissolving, in a first selected solvent, a first precursor which is in a gaseous state under normal temperature and normal pressure, to form a first precursor solution; dissolving a second precursor in a second selected solvent to form a second precursor solution, wherein the second precursor is a precursor of a metal element of Group I, Group II, Group III or Group IV; and in an inert gas atmosphere, adding the first precursor solution into a reaction vessel which contains the second precursor solution, wherein the first precursor chemically reacts with the second precursor to generate a nanocrystal. The present invention further discloses a nanocrystal prepared by the above method and an apparatus for preparing and storing a gas-dissolved solution. With the preparation method according to the invention, the amount of the first precursor in a gaseous state can be accurately (Continued)

controlled, the reaction is more uniform and more controllable, and the obtained nanocrystal has uniform volume distribution and a higher luminescent quantum yield.

18 Claims, 4 Drawing Sheets

(51) Int. Cl.

| | |
|---|---|
| *C01G 15/00* | (2006.01) |
| *C01B 21/06* | (2006.01) |
| *C01B 17/20* | (2006.01) |
| *C01G 9/08* | (2006.01) |
| *C01G 28/00* | (2006.01) |
| *C01B 13/14* | (2006.01) |
| *C01G 3/12* | (2006.01) |
| *C01B 25/06* | (2006.01) |
| *C01G 11/00* | (2006.01) |
| *B82Y 30/00* | (2011.01) |
| *B82Y 40/00* | (2011.01) |

(52) U.S. Cl.
CPC .............. *C01B 21/06* (2013.01); *C01B 25/06* (2013.01); *C01G 3/12* (2013.01); *C01G 9/08* (2013.01); *C01G 11/00* (2013.01); *C01G 15/00* (2013.01); *C01G 15/006* (2013.01); *C01G 28/00* (2013.01); *B82Y 30/00* (2013.01); *B82Y 40/00* (2013.01); *C01P 2002/52* (2013.01); *C01P 2002/54* (2013.01); *C01P 2002/80* (2013.01); *C01P 2002/84* (2013.01); *C01P 2004/64* (2013.01); *C01P 2004/80* (2013.01)

(56) References Cited

U.S. PATENT DOCUMENTS

| | | | |
|---|---|---|---|
| 2005/0260117 A1* | 11/2005 | Cossement | B82Y 30/00 423/445 R |
| 2006/0216510 A1* | 9/2006 | Denisyuk | B82Y 30/00 428/403 |
| 2008/0220593 A1 | 9/2008 | Pickett et al. | |
| 2009/0295005 A1* | 12/2009 | Rauscher | B82Y 30/00 264/5 |
| 2014/0264192 A1* | 9/2014 | Gresty | B82Y 30/00 252/519.3 |
| 2015/0225549 A1* | 8/2015 | Kim | B22F 9/06 524/113 |

FOREIGN PATENT DOCUMENTS

| | | | |
|---|---|---|---|
| CN | 101294073 A | | 10/2008 |
| CN | 101332979 A | | 12/2008 |
| CN | 102268253 A | | 12/2011 |
| CN | 102703082 A | | 10/2012 |
| CN | 102718248 A | | 10/2012 |
| CN | 102874767 | * | 10/2012 |
| CN | 102925141 A | | 2/2013 |
| CN | 104347728 | * | 2/2015 |
| CN | 204416080 U | | 6/2015 |
| WO | 2014030825 | * | 2/2014 |

* cited by examiner

NANOCRYSTAL PREPARATION METHOD, NANOCRYSTALS, AND APPARATUS FOR PREPARING AND STORING DISSOLVED GAS

RELATED APPLICATIONS

This application is a national stage entry, filed pursuant to 35 U.S.C. § 371, of PCT/CN2015/095369, filed Nov. 24, 2015, which claims the benefit of Chinese Patent Application No. 201510607472.8, filed Sep. 22, 2015, and which is incorporated herein by reference in its entirety for all purposes.

TECHNICAL FIELD

The present invention relates to a nanocrystal preparation method and a nanocrystal prepared by the method. The present invention further relates to an apparatus for preparing and storing a gas-dissolved solution.

TECHNICAL BACKGROUND

A nanocrystal, also known as a nanocrystalline, is a material which has a size of a few nanometers, usually in a range of 1-20 nanometers, and has a crystal structure. In general, a nanocrystal refers to a structure having a spherical or nearly spherical inner crystal core with one layer or a plurality of layers of shells wrapped thereon. Of course, a nanocrystal also includes a structure without a shell. A luminous nanocrystal or fluorescent nanocrystal refers to a crystal that has a nanocrystal structure, and emits light when being excited by an appropriate light source or voltage. Luminous characteristic of the fluorescent nanocrystal may be controlled through the composition, size and shell surface structure of the nanocrystal. Therefore, relative to organic materials, a fluorescent nanocrystal can provide excellent color purity, color diversity, photons and thermal stability. The luminous core may be a sphere, a strip, a rectangle, or even other polyhedral shapes having a total volume of not larger than 20 nm×20 nm×20 nm. The luminous stability of the nanocrystal may be improved through growth of a shell or a plurality of shells on the nanocrystal core. The fluorescent nanocrystal core may be composed of a metal, a metal oxide and semiconductor materials including compounds of Groups II-IV and III-V. The composition of the fluorescent nanocrystal may be changed by doping with one or more transition metal cations, so as to change the luminous wavelength and other luminous properties of the nanocrystal.

The fluorescent nanocrystal has been widely researched over the past 20 years, due to its special properties, such as optical properties that can be controlled through adjustment of size, high quantum efficiency, relatively narrow peak width at half height, and photodegradation resistance. Compared with organic dyes, the fluorescent nanocrystal, as a new-generation luminous material, has wider usages in many applications, such as luminous display devices, photovoltaic devices and biomarkers.

In general, the fluorescent nanocrystal may be synthesized by pyrolyzing a metal complex in the presence of a hydrophobic solvent at a temperature of 200-350° C. The fluorescent nanocrystal may also be prepared by using water, ethanediol and other hydrophilic solvent as reaction solvents at room temperature or elevated temperature. In order to achieve uniform reaction, reactants are usually dissolved in a solvent at room temperature or elevated temperature. Insoluble inorganic substances or reactants in a gaseous state may also be used to prepare semiconductor nanocrystals. However, nonuniform reaction and chemical non-equilibrium will generally cause poor repeatability and quality of nanocrystal synthesis. Reactants in a gaseous state, such as hydrogen sulfide, hydrogen phosphide and hydrogen arsenide, may also be used to prepare nanocrystals due to their high reactivity. When the nanocrystal is prepared by using the gas according to the prior art, the prepared gas precursor is usually directly supplied to a metal precursor. In this manner, the nanocrystal may also be obtained.

However, the synthesis of nanocrystal by using the in-situ precursor in a gaseous state has the following problems. The reaction is uncontrollable and difficult to be repeated. This is because the use level of a precursor in a gaseous state cannot be accurately controlled, which may lead to non-repeatable reaction, and may also lead to heterogeneous nucleation and nanocrystal growth. In addition, excessive gas not being reacted needs to be treated by an additional device or a cleaning process. An additional gas formation device and a drying system are required, since oxygen/water will affect the nanocrystal quality. Moreover, the above synthesis of nanocrystal is highly toxic and difficult to be treated. This is because hydrogen phosphide, hydrogen arsenide and like gases, which are highly toxic and need strict operation procedures, can be safely treated by well-trained specialized persons only.

SUMMARY OF THE INVENTION

A technical problem to be solved by the present invention is to provide a nanocrystal preparation method, which can accurately control the use level of a precursor in a gaseous state, so that the precursor uniformly reacts with other precursors to obtain a nanocrystal having uniform volume distribution, a controllable particle diameter and a high quantum yield.

The present invention provides a nanocrystal preparation method, including the following steps: dissolving, in a first selected solvent, a first precursor which is in a gaseous state under normal temperature and normal pressure, to form a first precursor solution; dissolving a second precursor in a second selected solvent to form a second precursor solution, wherein the second precursor is a precursor of a metal element of Group I, Group II, Group III or Group IV; and in an inert gas atmosphere, adding the first precursor solution into a reaction vessel which contains the second precursor solution, wherein the first precursor chemically reacts with the second precursor to generate a nanocrystal.

Preferably, the dissolving the first precursor in the first selected solvent is a physical change.

Preferably, before the first precursor is dissolved in the first selected solvent, water and oxygen are removed.

Preferably, the first precursor solution is injected below the liquid level of the second precursor solution at a preset rate.

Preferably, when the first precursor is dissolved in the first selected solvent, the temperature of the first selected solvent is set to be in a range of temperature, which is 0-5° C. from the melting point of the first selected solvent.

Preferably, the first selected solvent has a melting point of lower than 25° C., and a boiling point of higher than 150° C.

Preferably, the solubility of the first precursor in the first selected solvent is controlled by controlling the temperature.

Preferably, the addition of the first precursor solution into the second precursor solution is manually controlled or mechanically controlled at a preset rate and volume.

Preferably, the second precursor solution further includes a surfactant, and the surfactant includes one of the following substances: trialkylphosphine, trialkylphosphine oxide, alkylamine, moraine, alkylthiol, arylthiol, alkylarylthiol and fatty acid.

Preferably, the alkylamine is at least one of monosubstituted alkyl amine, disubstituted alkylamine and trisubstituted alkylamine, and the fatty acid is at least one of tetradecanoic acid, oleic acid and stearic acid.

Preferably, when adding the first precursor solution into the second precursor solution, the second precursor solution is in a temperature range of 50-300° C.; and after adding the first precursor solution into the second precursor solution, the mixed solution of the first precursor solution and the second precursor solution is in a temperature range of 150-350° C., and is kept at the temperature in a time range of 1 minute to 1 week.

Preferably, the chemical reaction is in a reaction temperature range of 150-350° C., and is kept in a reaction time range of 1 minute to 1 week.

Preferably, the first precursor includes at least one of the following substances: hydrogen sulfide, hydrogen selenide, hydrogen telluride, ammonia gas, hydrogen phosphide, hydrogen arsenide and hydrogen antitnonide.

Preferably, the second precursor includes at least one of the following substances: metal alkyl, metal oxide, metal halide, metal carboxylate, metal phosphonate, metal hypophosphite, metal phosphate, metal sulfonate and metal borate.

Preferably, the metal element in the second precursor includes one of zinc, manganese, indium, cadmium and lead.

Preferably, the first selected solvent and the second selected solvent are an identical solvent.

Preferably, the first selected solvent has a similar polarity as the first precursor.

Preferably, the first selected solvent and the second selected solvent respectively include at least one of the following substances: long-chain alkane, long-chain alkene, long-chain alkanol, long-chain alkylamine, long-chain alkyl ester, long-chain alkyl fatty acid, long-chain trialkylphosphine, trialkylphosphine oxide, water and water solution.

Preferably, the long-chain alkane includes at least one of the following substances: 1-octadecane, 1-heptadecane, 1-hexadecane, 1-dodecane, 1-tetradecane, 1-tridecane, 1-pristane, 1-phytane, 1-pentadecane, paraffin, 1-eicosane, 1-octacosane and 1-tetracosane; the long-chain alkene includes at least one of the following substances: 1-octadecene, 1-dodecylene, 1-hexadecene, 1-tetradecene, 1-heptadecene, 1-nonadecene, 1-eicosylene, 1-tridecylene and 1-pentadecene; the long-chain alkylamine includes at least one of the following substances: hexadecylamine, octadecylamine, tetradecylamine, decylamine, dodecylamine, undecylamine, tridecylamine, 1,12-diaminododecane, 1,18-diaminooctadecane, 1,16-diaminohexadecane, 1,14-diaminoetradecylamine and oleylamine; the long-chain alkanol includes at least one of the following substances: 1-octadecanol, 1-hexadecanol, 1-eicosanol, 1-dodecanol, 1-tridecanol, 1-tetradecanol, 1-docosanol, 1-pentadecanol, 1-heptadecanol, 1-nonadecanol and 1-eicosanol; the long-chain alkyl ester includes at least one of the following substances: stearyl ester, dodecyl acetate, hexadecyl acetate, eicosyl acetate, pentadecyl ester and heptadecyl ester; the long-chain alkyl fatty acid includes at least one of the following substances: decanoic acid, undecanoic acid, dodecanoic acid, tridecanoic acid, tetradecanoic acid, pentadecanoic acid, hexadecanoic acid, heptadecanoic acid, stearic acid and eicosanoic acid; and the long-chain alkylthiol includes at least one of the following substances: 1-undecanethiol, 1-dodecanethiol, 1-tetradecanethiol, 1-pentadecanethiol, 1-hexadecanethiol and 1-octadecanethiol.

Preferably, the preparation method further includes a third precursor solution in which a third precursor is dissolved, and before or after the first precursor solution is added into the second precursor solution, the third precursor solution is added into the reaction vessel.

Preferably, the third precursor can chemically react with the first precursor or the second precursor to generate a nanocrystal.

Preferably, the third precursor can chemically react with itself at a certain temperature to generate a nanocrystal.

Preferably, the preparation method further includes a fourth precursor solution in which a fourth precursor is dissolved, and after the third precursor solution is added into the reaction vessel, the fourth precursor solution is added into the reaction vessel.

Preferably, the first precursor is hydrogen phosphide, the second precursor is an indium precursor or a mixture of an indium precursor and a zinc precursor, and the third precursor is a sulfur precursor or a zinc sulfide precursor.

Preferably, the first precursor is hydrogen phosphide, the second precursor is an indium precursor or a mixture of an indium precursor and a zinc precursor, and the other precursors are a sulfur precursor or a zinc sulfide precursor or a mixture of a sulfur precursor and a zinc precursor.

The present invention further provides a nanocrystal, which is prepared by any one of the above preparation methods.

Preferably, the nanocrystal includes a core and at least one layer of shell.

Preferably, the nanocrystal core is indium phosphide, and its shell is zinc sulfide.

Preferably, the nanocrystal is a nanocrystal core without a shell.

Preferably, the nanocrystal is a semiconductor nanocrystal, including at least one of the following substances: a compound of Group II-Group VIA, a compound of Group IV-Group VIA, a compound of Group III-Group VA, a compound of Group I-Group VIA, copper indium sulfide and copper indium selenide. The compound of Group II-Group VIA includes: zinc selenide, zinc telluride, zinc sulfide, cadmium selenide, cadmium sulfide, cadmium telluride, zinc oxide, mercuric sulfide, mercuric telluride, magnesium oxide, magnesium sulfide, magnesium telluride, cadmium sulfoselenide, cadmium sulfotelluride, zinc sulfoselenide, zinc sulfotelluride, zinc selenotelluride, mercuric sulfoselenide, mercuric sulfotelluride mercuric selenotelluride, cadmium zinc selenide, cadmium zinc sulfide, cadmium zinc telluride, cadmium mercury sulfide, cadmium zinc selenotelluride, cadmium zinc sulfotelluride, cadmium zinc sulfoselenide, cadmium mercury sulfotelluride, cadmium mercury sulfoselenide, cadmium mercury selenotelluride, zinc mercury sulfotelluride, zinc mercury sulfoselenide, zinc mercury selenotelluride, zinc magnesium sulfide, zinc magnesium telluride, zinc magnesium selenide, zinc magnesium oxide, zinc magnesium oxysulfide, zinc magnesium sulfoselenide, zinc magnesium telluroselenide and zinc magnesium sulfotelluride; the compound of Group IV-Group VIA includes: lead sulfide, lead selenide, lead telluride, tin sulfide, tin selenide, tin telluride, tin sulfotelluride, tin sulfoselenide, tin selenotelluride, lead sulfotelluride, lead sulfoselenide, lead selenotelluride, lead tin sulfide, lead tin telluride, lead tin selenide, lead tin sulfoselenide and lead tin sulfotelluride; the compound of Group III-Group VA includes: indium phosphide, indium arsenide, gallium nitride, gallium phosphide, gallium arsenide, gallium antimonide, aluminum nitride, aluminium phosphide, aluminium arsenide, aluminum antimonide, indium nitride, indium antimonide, gallium phosphide nitride, gallium arsenide nitride, gallium antimonide nitride, gallium antimonide phosphide, gallium arsenide phosphide, aluminium phosphide nitride, aluminum arsenide nitride, gallium aluminum phosphide nitride, gallium aluminum antimonide nitride, gallium aluminum antimonide phosphide, gallium aluminum arsenide phosphide, gallium indium phosphide nitride, gallium indium arsenide nitride, gallium indium antimonide nitride, gallium indium antimonide phosphide, gallium indium arsenide phosphide, aluminum indium nitride, aluminum indium phosphide, aluminum indium arsenide and aluminum indium antimonide; and the compound of Group I-Group VI includes: copper sulfide, copper telluride, copper selenide, silver sulfide, silver selenide and silver telluride.

Preferably, the nanocrystal is a semiconductor nanocrystal chemically doped with one or more transition metal cations, and the nanocrystal includes at least one of the following substances: $Mn^{2+}$-doped zinc selenide, $Mn^{2+}$-doped zinc sulfide, $Mn^{2+}$-doped zinc telluride, $Mn^{2+}$-doped cadmium selenide, $Mn^{2+}$-doped cadmium sulfide, $Mn^{2+}$-doped cadmium telluride, $Mn^{2+}$-doped zinc selenide, $Mn^{2+}$-doped zinc sulfide, $Mn^{2+}$-doped zinc telluride, $Mn^{2+}$-doped cadmium selenide, $Mn^{2+}$-doped cadmium sulfide, $Mn^{2+}$-doped cadmium telluride, $Co^{2+}$-doped zinc selenide, $Co^{2+}$-doped zinc sulfide, $Co^{2+}$-doped zinc telluride, $Co^{2+}$-doped cadmium selenide, $Co^{2+}$-doped cadmium sulfide, $Co^{2+}$-doped cadmium telluride, $Ni^{2+}$-doped zinc selenide, $Ni^{2+}$-doped zinc sulfide, $Ni^{2+}$-doped zinc telluride, $Ni^{2+}$-doped cadmium selenide, $Ni^{2+}$-doped cadmium sulfide, $Ni^{2+}$-doped cadmium telluride, $Ag^{+}$-doped zinc selenide, $Ag^{2+}$-doped zinc sulfide, $Ag^{2+}$-doped zinc telluride, $Ag^{2+}$-doped cadmium selenide, $Ag^{+}$-doped cadmium sulfide, $Ag^{2+}$-doped cadmium telluride, $Cu^{2+}$-doped indium phosphide, $Cu^{2+}$-doped indium arsenide, $Ag^{2+}$-doped indium phosphide, $Ag^{2+}$-doped indium arsenide, $Mn^{2+}$-doped indium phosphide and $Mn^{2+}$-doped indium arsenide.

Preferably, the nanocrystal is a rare-earth-doped upconversion nanocrystal, and the rare earth element includes at least one of the following elements: ytterbium, erbium, thulium, holmium, cerium, neodymium, gadolinium, samarium and europium.

Preferably, the nanocrystal is a metal oxide nanocrystal, and the metal oxide nanocrystal includes at least one of titanium oxide nanocrystal and calcium oxide nanocrystal.

Preferably, the nanocrystal core is an inorganic compound, and the cubic volume of the nanocrystal is less than 100 nm×100 nm×100 nm.

The present invention further discloses a display device, the display device includes a display panel and a backlight module, and the backlight module includes a nanocrystal prepared by the above preparation method.

The present invention further discloses a lighting device, and the lighting device includes a nanocrystal prepared by the above preparation method.

The present invention further discloses an anti-counterfeit label, and the anti-counterfeit label includes a nanocrystal prepared by the above preparation method.

The present invention further discloses an apparatus for preparing and storing a gas-dissolved solution, including a storer and a tail gas absorber connected to the storer, wherein the storer includes a low temperature circulating pump providing a low temperature, a stirrer, a heat-conducting liquid and a storage bottle containing a solvent for dissolving the gas.

Preferably, the apparatus further includes a gas processing device connected to the stony for removing oxygen and water, and the gas processing device includes a drying tube containing a drying agent.

The preparation method according to the present invention has the following beneficial effects. The amount of the precursor in a gaseous state can be accurately controlled, the nanocrystal formation reaction is more uniform, and the nanocrystal size is more controllable and repeatable. The precursor in a gaseous state is dissolved in a solvent to take part in the reaction, so that no additional devices or steps are required to treat unreacted gases. Compared with the preparation method in which gas directly takes part in reactions, the preparation process is simplified, and the difficulty of the preparation process is lowered. The nanocrystal prepared according to the present invention has uniform volume distribution, a small peak width at half height and a higher luminous quantum yield, and the emission peak will have no red shift or little red shift. The apparatus for preparing and storing a gas-dissolved solution according to the present invention can achieve preparation and storage as a whole, thereby avoiding the influence of temperature on the gas-dissolved solution during transfer of the gas-dissolved solution, and realizing very convenient use of the gas-dissolved solution.

DETAILED DESCRIPTION OF THE INVENTION

The technical solutions according to the examples of the present invention will be described in detail below in conjunction with the embodiments of the present invention. Apparently, the described embodiments are only a part, instead of all, of the embodiments of the present invention. All the other embodiments obtained by those skilled in the art based on the embodiments of the present invention without creative labor fall within the scope of protection of the present invention.

The present invention discloses a nanocrystal preparation method, including the following steps: dissolving, in a first selected solvent, a first precursor which is in a gaseous state under normal temperature and normal pressure, to form a first precursor solution; dissolving a second precursor in a second selected solvent to form a second precursor solution, wherein the second precursor is a precursor of a metal element of Group I, Group II, Group III or Group IV; and in an inert gas atmosphere, adding the first precursor solution into a reaction vessel which contains the second precursor solution, wherein the first precursor chemically reacts with the second precursor to generate a nanocrystal.

The nanocrystal prepared according to the invention refers to a nanoparticle having a size of 100 nm or smaller in each dimension of the three-dimensional volume. The nanocrystal according to the invention includes, but is not limited to the following names: nanocrystalline, nanoparticle, fluorescent nanoparticle, luminous nanoparticle, quantum dot, upconversion particle and upconversion luminescent material.

In a preferred embodiment, the nanocrystal according to the invention is a quantum dot having a particle diameter of 1-20 nm. More preferably, the nanocrystal according to the invention has a particle size of 2-10 nm.

Figure 1:
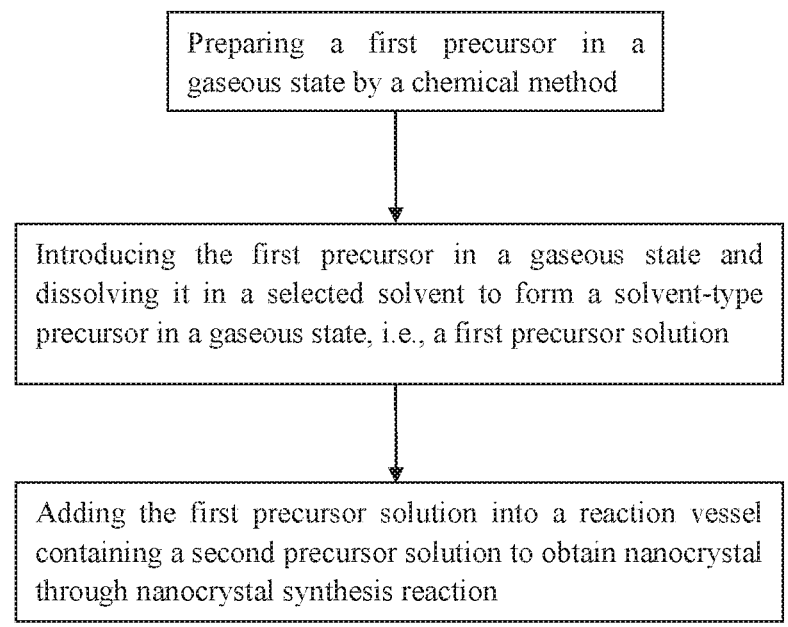
FIG. 1 is an illustrative flow diagram of a nanocrystal preparation method according to the invention.

In a preferred embodiment, the invention further includes a step of preparing a first is precursor through a chemical reaction. Specific steps of the example are shown in FIG. 1.

In a nanocrystal preparation process, oxygen and water will affect quality of nanocrystal. Therefore, the obtained first precursor in a gaseous state is dissolved in a first solvent after removing oxygen and water.

In a preferred embodiment, the invention further includes a step of purifying a nanocrystal. Specifically, after a first precursor chemically reacts with a second precursor to generate a nanocrystal, a nanocrystal solid is obtained through centrifugation, and then dispersed by using a dispersant, which may be repeated for many times. Finally, the nanocrystal is stored in a dispersant. A less toxic organic solvent is selected as the dispersant. Preferably, n-hexane or acetone is selected as the dispersant.

According to the present invention, a reactant in a gaseous state, the reaction amount of which is difficult to be controlled, is dissolved in a solution by physical means, so that the reactant is converted from a gaseous state to a liquid state. Therefore, the amount of the added reactant can be accurately controlled, and the reaction can be finely controlled, so that the reaction is more uniform, and a nanocrystal with uniform volume distribution and better luminous properties is obtained.

In order to prevent water or oxygen from being brought into the reaction between a first precursor and a second precursor, a first precursor solution is prepared under the protection of argon gas or other inert gas, and the first precursor is dried and then dissolved in a first selected solvent.

The dissolution of the first precursor in the first selected solvent is a physical change. The dissolution involves diffusion of the first precursor molecule in the first selected solvent, and salvation of the first precursor by the first selected solvent, which neither changes the chemical structure of the first precursor itself, nor affects the chemical reaction between the first precursor and the second precursor.

The first precursor solution is formed by supplying the first precursor in a gaseous state into the first selected solvent at a certain rate for a period of time, with stirring or without stirring. The first precursor solution may be saturated or unsaturated.

The amount of the first precursor dissolved in the first selected solvent may be controlled by changing the temperature. Different temperatures correspond to different solubilities. In general, the lower the temperature is, the more it is beneficial to gas dissolution in the solvent. The amount of the first precursor dissolved in the first selected solvent is increased by lowering the temperature. However, in order to avoid solvent solidification, the temperature cannot be lowered to any extent. In a preferred embodiment, when the first precursor is dissolved in the first selected solvent, the temperature of the first selected solvent is set to be in a range of temperature, which is 0-5° C. from the melting point of the first selected solvent, to obtain the maximum amount of the absorbed first precursor in a gaseous state. Preferably, the temperature of the first selected solvent is set to 0-2° C. higher than the melting point of the first selected solvent. The more the amount of the absorbed first precursor is, the less the required amount of the solvent is. When the first precursor is added into the second precursor solution to take part in the reaction, the less the amount of the added solvent is, the more it is beneficial to the reaction between the first precursor and the second precursor for generating a nanocrystal of better quality.

The first precursor solution obtained at a temperature shall be kept at the temperature or a lower temperature to prevent the first precursor from being dissolved out when the temperature changes. Preferably, the obtained first precursor solution is air-tightly kept at a constant temperature.

After the first precursor solution is obtained, accurate concentration of the first precursor can be determined by a titration method. Thus, when the first precursor solution is added into the second precursor solution, the amount of the added first precursor can be accurately controlled by controlling the added volume.

In a preferred embodiment, the first precursor is $H_2S$ gas, the solubility of which in a solvent depends on the solvent polarity and temperature. At 20° C., the solubility of $H_2S$ in n-hexadecane and 1-hexadecane is respectively 0.07 M and 0.24 M. Preferably, when the first precursor is hydrogen sulfide, 1-hexadecane is used as the first selected solvent. The hydrogen sulfide concentration of the hydrogen sulfide solution can be determined by titrating with an alcoholic solution of $AgNO_3$. In another embodiment, the first precursor is hydrogen phosphide, the solubility of which in cyclohexane and benzene is respectively 0.1 M and 0.3 M.

When the first precursor solution is prepared, excessive first precursor is absorbed by another solvent or a waste treatment solution. Selective solvent absorption is a main method for cleaning a gas by removing unwanted impurities. In a preferred embodiment, the selected solvent is a water solution of methyldiethanolamine and sulfolane, and is used for absorbing hydrogen sulfide gas.

Because gas in the first precursor solution tends to overflow at a high temperature, the first precursor solution is added into the second precursor solution by injecting the first precursor solution below the liquid level of the second precursor solution to avoid the first precursor from overflowing.

In the present invention, the first precursor chemically reacts with the second precursor at a reaction temperature preferably in a range of 150° C.-350° C. and further preferably in a range of 200° C.-350° C. The reaction time is preferably in a range of 0.1 minute to 1 week, and further preferably in a range of 1 minute to 1 hour. The reaction temperature and the reaction time are the temperature and time in the process since the moment the first precursor solution is added into the second precursor solution until preparation of the nanocrystal is completed. The reaction temperature not only shall contribute to the occurrence of the reaction, but also shall not exceed the boiling point of the first selected solvent or the second selected solvent.

In the present invention, before the first precursor solution is added into the second precursor solution, the second precursor solution is controlled to be in a temperature range of 50° C.-300° C. When the first precursor solution is added into the second precursor solution, the second precursor solution is controlled to be in a temperature range of 50° C.-300° C., and preferably 100-300° C. After the first precursor solution is added into the second precursor solution, the mixed solution of the first precursor solution and the second precursor solution is controlled to be in a temperature range of 150° C.-350° C., and is kept in a time range of 1 minute to 1 week, and further preferably in a range of 1 minute to 1 hour.

The chemical reaction between the first precursor and the second precursor is instantaneous, and the sooner the first precursor solution is added into the second precursor solution, the better it is. Besides, the reaction solution is constantly stirred to prevent the first precursor from overflowing in an overlong time and thus failing to take part in the reaction.

According to the invention, different reaction temperatures may be selected for different reaction stages. In a preferred embodiment, in 30 minutes to 2 hours after the first precursor solution is added into the second precursor solution, the reaction is controlled to be at a reaction temperature in the range of 200-350° C., and then, the reaction temperature is controlled to be at another reaction temperature in the range of 200-350° C.

According to the invention, the first precursor may be directly purchased, or may be prepared through synthesis. According to the invention, the first precursor is a compound mainly consisting of elements of Group II and Group III. Preferably, the first precursor includes at least one of the following substances: hydrogen sulfide, hydrogen selenide, hydrogen telluride, ammonia gas, hydrogen phosphide, hydrogen arsenide, and hydrogen antimonide. Most preferably, the first precursor is hydrogen phosphide.

In a preferred embodiment, the first precursor is hydrogen sulfide; and the hydrogen sulfide gas is generated through a reaction between $Na_2S$ and HCl solution under the protection of argon gas. In another preferred embodiment, the first precursor is hydrogen phosphide; and the hydrogen phosphide gas is generated through a reaction between $Zn_3P_2$ and $H_2SO_4$ solution under the protection of argon gas.

The second precursor includes all the precursors that can synthesize, in terms of chemical means, a nanocrystal with the first precursor in a gaseous state. Preferably, the second precursor includes at least one of the following substances: metal alkyl, metal oxide, metal halide, metal carboxylate, metal phosphonate, metal hypophosphite, metal phosphate, metal sulfonate and metal borate.

Preferably, the second precursor includes a metal element selected from elements of Group II, Group III or Group IV. More preferably, the second precursor includes a metal element, which is one of zinc, manganese, indium, cadmium and lead. In a preferred embodiment, the second precursor is a zinc salt precursor selected from at least one of zinc stearate, zinc acetate, zinc phosphate, zinc hypophosphite, zinc sulfonate, zinc borate, zinc halide and zinc oxide.

In a preferred embodiment of the present invention, a nanocrystal having a core-shell structure is synthesized, wherein the first precursor is hydrogen phosphide, and the second precursor includes a zinc salt precursor and an indium salt precursor.

The first selected solvent is used to dissolve the first precursor, and enable the first precursor in a gaseous state to convert to a liquid state, so as to better control the first precursor to take part in the reaction, and enable the reaction to be more uniform. The first selected solvent is any solvent or solution that can dissolve the first precursor. The second selected solvent is used to dissolve the second precursor. The second selected solvent is preferably the same as that of the first selected solvent. The boiling points of the first selected solvent and the second selected solvent shall be higher than the lowest temperature required for a nanocrystal formation reaction between the first precursor and the second precursor. Since the lowest temperature of different nanocrystal formation reactions is different, and changes with other conditions, the selected solvents shall be specifically selected based on specific circumstances.

On the one hand, the first selected solvent is required to have a low melting point, and a high amount of dissolved first precursor is obtained by lowering the temperature to a temperature close to the melting point of the first selected solvent. On the other hand, the boiling point of the first selected solvent shall be higher than the lowest temperature required for the nanocrystal formation reaction. The first selected solvent shall be selected based on comprehensive consideration of the above two aspects. Preferably, the first selected solvent has a melting point of lower than 25° C., and a boiling point of higher than 150° C. In a preferred embodiment, the first selected solvent used to prepare the hydrogen phosphide solution is one of 1-octadecene, 1-hexadecene and oleylamine.

In a preferred embodiment, the first selected solvent is the same as the second selected solvent. Thus, when the first precursor solution reacts with the second precursor solution, it is more beneficial to the contact and full reaction between the first precursor and the second precursor. Of course, the reaction between the first precursor and the second precursor would not be hindered if the first selected solvent is different from the second selected solvent. As long as the first precursor is mixed with the second precursor in a liquid phase environment, and can contact with the second precursor with the help of an external force, such as stirring, it can contribute to a chemical reaction between both, thereby generating a nanocrystal.

The first selected solvent may be water or a water solution including other solutes, or may also be an organic solvent or an organic solution.

Preferably, the first selected solvent is an organic substance including at least one of the following substances: long-chain alkane, long-chain alkene, long-chain alkanol, long-chain alkylamine, long-chain alkyl ester, long-chain alkyl fatty acid, long-chain alkylthiol, trialkylphosphine and trialkylphosphine oxide. The long chain includes, but is not limited to, a straight chain having 8-30 carbon atoms. The long-chain alkane includes at least one of the following substances: 1-octadecane, 1-heptadecane, 1-hexadecane, 1-dodecane, 1-tetradecane, 1-tridecane, 1-pristane, 1-phytane, 1-pentadecane, paraffin, 1-eicosane, 1-octacosane and 1-tetracosane. The long-chain alkene includes at least one of the following substances: 1-octadecene, 1-dodecylene, 1-hexadecene, 1-tetradecene, 1-heptadecene, 1-nonadecene, 1-eicosylene, 1-tridecvlene and 1-pentadecene. The long-chain alkylamine includes at least one of the following substances: hexadecylamine, octadecylamine, tetradecylamine, decylamine, dodecylamine, undecylamine, tridecylamine, 1,12-diaminododecane, 1,18-diaminooctadecane, 1,16-diaminohexadecane, 1,14-diaminotetradecylamine, oleylamine and octylamine. The long-chain alkanol includes at least one of the following substances: 1-octadecanol, 1-hexadecanol, 1-eicosanol, 1-dodecanol, 1-tridecanol, 1-tetradecanol, 1-docosanol, 1-pentadecanol, 1-heptadecanol, 1-nonadecanol and 1-eicosanol. The long-chain alkyl ester includes at least one of the following substances: stearyl ester, dodecyl acetate, hexadecyl acetate, eicosyl acetate, pentadecyl ester and heptadecyl ester. The long-chain alkyl fatty acid includes at least one of the following substances: decanoic acid, undecanoic acid, dodecanoic acid, tridecanoic acid, tetradecanoic acid, pentadecanoic acid, hexadecanoic acid, heptadecanoic acid, stearic acid and eicosanoic acid. The long-chain alkylthiol includes at least one of the following substances: 1-undecanethiol, 1-dodecanethiol, 1-tetradecanethiol, 1-pentadecanethiol, 1-hexadecanethiol and 1-octadecariethiol.

The second precursor solution can be added with, besides the second precursor and the second selected solvent, a surfactant. The surfactant may play a role in activating the second precursor to promote nanocrvstal growth. The surfactant may also be known as a ligand. The surfactant is very important for the stability of a nanocrvstal after formation, and can enable the nanocrystal to be stably dispersed in a solvent after formation. Preferably, the surfactant includes at least one of the following substances: trialkylphosphine, trialkylphosphine oxide, alkylamine, alkylthiol arylthiol and fatty acid. Preferably, the surfactant is an alkylamine, which includes at least one of monosubstituted alkylamine, disubstituted alkylamine and is trisubstituted alkylamine. Preferably, the alkylamine is octadecylamine. In a preferred embodiment, the surfactant is oleylamine.

The volume ratio of the surfactant to the second selected solvent is in a range of 0.1-10. The molar ratio of the second precursor to the surfactant is in a range of 1:0-1:5.

In a preferred embodiment, before being added into the second selected solvent, the second precursor reacts with a stabilizer to keep certain stability in the second selected solvent. In a specific embodiment, the second precursor reacts with the stabilizer under vacuum at a high temperature to obtain a stabilizer-coated second precursor. Preferably, the stabilizer is a metal complexant selected from saturated or unsaturated fatty acids, such as tetradecanoic acid, oleic acid and stearic acid.

In a preferred embodiment, the first precursor is hydrogen phosphide, and the second precursor is an indium precursor. The first selected solvent includes, but is not limited to, at least one of 1-octadecene, 1-hexadecene, oleylamine and octylamine. The second selected solvent is 1-octadecene, the second precursor solution further includes a surfactant, which includes, but is not limited to, tetradecanoic acid, oleic acid and stearic acid. The second precursor solution further includes oleylamine.

The step of adding the first precursor solution into the second precursor solution is a step of a chemical reaction. The adding method is manual adding or mechanically controlled adding. The mechanically controlled adding method includes, for example, injecting the first precursor solution into the second precursor solution by a mechanical pump.

Since the first precursor solution is required to be kept at a certain temperature, and the reaction temperature is in a range of 150-350° C., if it is not properly controlled, the first precursor is very likely to overflow from the solvent before reacting with the second precursor. Therefore, the moment, volume, rate and temperature at which the first precursor solution is added into the second precursor solution have an important influence on nanocrystal, and is determine the nanocrystal illumination intensity, peak width at half height, stability and emission wavelength.

In order to guarantee that the first precursor is not dissolved out when being added into the second precursor solution, the second precursor solution shall be heated to a desired reaction temperature before the first precursor solution is added. Preferably, when the first precursor solution is added into the second precursor solution, the second precursor temperature shall be controlled at 150° C.-350° C. The first precursor solution shall be added as soon as possible, so that after the first precursor solution is added, the first precursor quickly reacts with the second precursor to form a nanocrystal. The speed of adding the first precursor solution has an influence on the nanocrystal purity. If the amount of the first precursor solution needed to be added into the second precursor solution at a time is too large, the first precursor solution may be divided into small portions, and then added into the second precursor solution, so that the first precursor solution can fully react with the second precursor solution when being added into the second precursor solution to prevent the first precursor from dissolving out at the current reaction temperature in case of insufficient reaction. In a preferred embodiment, the amount of the first precursor solution added into the second precursor solution each time is no more than 2 ml. The first precursor solution is added at a preset rate in a range of 0.1 ml/h-100 ml/h, and preferably in a range of 0.5 ml/h-5 ml/h.

The moment the first precursor solution is added into the second precursor solution may be before or during the core formation reaction of the nanocrystal synthesis, or during or after the shell growth reaction. The moment shall be selected specifically according to specific reaction requirements and product requirements.

The volume of the first precursor solution added into the second precursor solution depends on the ratio of the first precursor to the second precursor. In theory, the molar ratio of the first precursor to the second precursor may be any ratio, and the first precursor and the second precursor may be at any concentration. According to the preparation method of the invention, as long as they are mixed, a corresponding nanocrystal will be formed. However, the first precursor concentration, the second precursor concentration and the molar ratio of the first precursor to the second precursor have an influence on the quality of the formed nanocrystal.

Preferably, the molar ratio of the first precursor to the second precursor is in a range of 0.1-5, the first precursor concentration is preferably in a range of 0.01-10 M, and the second precursor concentration is preferably in a range of 0.01-10 M. More preferably, the first precursor concentration is preferably in a range of 0.1-1 M.

In a preferred embodiment, the preparation method according to the invention further includes adding a third precursor solution, in which a third precursor is dissolved, into the reaction vessel before or after the first precursor solution is added into the second precursor solution. The third precursor may a precursor of a metal element of Group I, Group II, Group III or Group IV, and may also be a precursor of an element of Group V or Group VI.

In a preferred embodiment, the present invention discloses a preparation method of a nanocrystal with indium phosphide as the core and with zinc sulfide as the shell, specifically including the steps as follows: preparing hydrogen phosphide gas; supplying the hydrogen phosphide gas, after oxygen and water being removed, into an organic solvent in an inert gas atmosphere to form dissolved hydrogen phosphide gas: and adding certain amounts of an indium salt precursor, a zinc salt precursor, 1-octadecene (ODE for short) and a surfactant into a reaction vessel, wherein the molar ratio of the indium salt precursor to the zinc salt precursor is 1:1-1:10. A reaction solvent is heated to 100° C.-150° C., and further heated to 200° C.-270° C. in an inert gas atmosphere, a certain amount of dissolved hydrogen phosphide gas is injected below the liquid level in the reaction vessel whilst stirring, and then the reaction vessel is kept under these conditions for 0.1 minute to 2 hours. Then, a sulfur precursor, a sulfur precursor solution, a zinc sulfide precursor or a zinc sulfide precursor solution is injected below the liquid level of the reaction vessel, and then the reaction vessel is kept at a temperature of 150-350° C. for 0.5 minute to 24 hours. The surfactant is preferably oleylamine, the organic solvent for dissolving hydrogen phosphide is preferably one of 1-octadecene, 1-hexadecene, oleylamine and octylamine, and the sulfur precursor is preferably dissolved hydrogen sulfide gas or dodecylthiol. Preferably, before being added into the reaction vessel, the indium salt precursor and the zinc salt precursor are mixed with a fatty acid and ODE in an inert gas atmosphere to form a fatty-acid-coated iridium or zinc precursor at 110-120° C. The molar ratio of the zinc salt precursor to the fatty acid is in a range of 1:0-1:5. The fatty acid is preferably tetradecanoic acid, oleic acid or stearic acid.

The nanocrystal prepared by the preparation method according to the invention may have a plurality of structures. In a preferred embodiment, the nanocrystal is a single nanocrystal with a functional group but without a shell in the outer layer. In a preferred embodiment, the nanocrystal includes a core and at least one layer of shell. In a specific embodiment, the nanocrystal includes a core and a layer of shell, and presents a core-shell structure. In another specific embodiment, the nanocrystal includes a core and two layers of shell, and presents a core-shell structure.

In a specific embodiment, the core of the nanocrystal is manganese sulfide, and its shell is zinc sulfide. According to the embodiment, the nanocrystal is prepared by simultaneously adding a manganese precursor and a zinc precursor into a second selected solvent. Of course, the zinc precursor may also be added into the second selected solvent after forming a manganese sulfide nanocrystal core.

In a specific embodiment, the core of the nanocrystal is indium phosphide, and its shell is zinc sulfide.

According to the preparation method of the invention, a semiconductor nanocrystal may be prepared, including at least one of the following substances: a compound of Group II-Group VIA (referring in particular to a compound consisting of an element of Group II and an element of Group VIA), a compound of Group IV-Group VIA (referring in particular to a compound consisting of an element of Group IV and an element of Group VIA), a compound of Group III-Group VA (referring in particular to a compound consisting of an element of Group III and an element of Group VA) and a compound of Group I-Group VIA (referring in particular to a compound consisting of an element of Group I and an element of Group VIA), wherein the element of Group I includes an element of Group IA and an element of Group IB, the element of Group II includes an element of Group IIA and an element of Group IIB, the element of Group III includes an element of Group IIIA and an element of Group IIIB, and the element of Group IV includes an element of Group IVA and an element of Group IVB.

The compound of Group II-Group VIA includes: zinc selenide, zinc telluride, zinc sulfide, cadmium selenide, cadmium sulfide, cadmium telluride, zinc oxide, mercuric sulfide, mercuric telluride, magnesium oxide, magnesium sulfide, magnesium telluride, cadmium sulfoselenide, cadmium sulfotelluride, zinc sulfoselenide, zinc sulfotelluride, zinc selenotelluride, mercuric sulfoselenide, mercuric sulfotelluride mercuric selenotelluride, cadmium zinc selenide, cadmium zinc sulfide, cadmium zinc telluride, cadmium mercury sulfide, cadmium zinc selenotelluride, cadmium zinc sulfotelluride, cadmium zinc sulfoselenide, cadmium mercury sulfotelluride, cadmium mercury sulfoselenide, cadmium mercury selenotelluride, zinc mercury sulfotelluride, zinc mercury sulfoselenide, zinc mercury selenotelluride, zinc magnesium sulfide, zinc magnesium telluride, zinc magnesium selenide, zinc magnesium oxide, zinc magnesium oxysulfide, zinc magnesium sulfoselenide, zinc magnesium telluroselenide and zinc magnesium sulfotelluride. In a preferred embodiment, the nanocrystal includes at least one of the above compounds of Group II-Group VIA.

The compound of Group IV-Group VIA includes: lead sulfide, lead selenide, lead telluride, tin sulfide, tin selenide, tin telluride, tin sulfotelluride, tin sulfoselenide, tin selenotelluride, lead sulfotelluride, lead sulfoselenide, lead selenotelluride, lead tin sulfide, lead tin telluride, lead tin selenide, lead tin sulfoselenide and lead tin sulfotelluride. In a preferred embodiment, the nanocrystal includes at least one of the above compounds of Group IV-Group VIA.

The compound of Group III-Group VA includes: indium phosphide, indium arsenide, gallium nitride, gallium phosphide, gallium arsenide, gallium antimonide, aluminum nitride, aluminium phosphide, aluminium arsenide, aluminum antimonide, indium nitride, indium antimonide, gallium phosphide nitride, gallium arsenide nitride, gallium antimonide nitride, gallium antimonide phosphide, gallium arsenide phosphide, aluminium phosphide nitride, aluminum arsenide nitride, gallium aluminum phosphide nitride, gallium aluminum antimonide nitride, gallium aluminum antimonide phosphide, gallium aluminum arsenide phosphide, gallium indium phosphide nitride, gallium indium arsenide nitride, gallium indium antimonide nitride, gallium indium antimonide phosphide, gallium indium arsenide phosphide, aluminum indium nitride, aluminum indium phosphide, aluminum indium arsenide and aluminum indium antimonide; and the compound of Group I-Group VI includes: copper sulfide, copper telluride, copper selenide, silver sulfide, silver selenide and silver telluride. In a preferred embodiment, the nanocrystal includes at least one of the above compounds of Group III-Group VIA.

In a preferred embodiment, the nanocrystal is copper indium sulfide ($CuInS_2$) or copper indium selenide (CuInSe). According to the preparation method, the first precursor is hydrogen sulfide or hydrogen selenide, and the second precursor is a copper salt precursor or an indium salt precursor.

According to the preparation method of the invention, a semiconductor nanocrystal chemically doped with one or more transition metal cations may be prepared, specifically including the following steps: adding a precursor of the transition metal cations to be doped into a second precursor solution, and then adding a first precursor solution, so that the first precursor reacts with the second precursor and the precursor of the transition metal cations to be doped, so as to venerate the nanocrystal.

The semiconductor nanocrystal doped with one or more transition metal cations includes at least one of the following substances: $Mn^{2+}$-doped zinc selenide, $Mn^{2+}$-doped zinc sulfide, $Mn^{2+}$-doped zinc telluride, $Mn^{2+}$-doped cadmium selenide, $Mn^{2+}$-doped cadmium sulfide, $Mn^{2+}$-doped cadmium telluride, $Mn^{2+}$-doped zinc selenide, $Mn^{2+}$-doped zinc sulfide, $Mn^{2+}$-doped zinc telluride, $Mn^{2+}$-doped cadmium selenide, $Mn^{2+}$-doped cadmium sulfide, $Mn^{2+}$-doped cadmium telluride, $Co^{2+}$-doped zinc selenide, $Co^{2+}$-doped zinc sulfide, $Co^{2+}$-doped zinc telluride, $Co^{2+}$-doped cadmium selenide, $Co^{2+}$-doped cadmium sulfide, $Co^{2+}$-doped cadmium telluride, $Ni^{2+}$-doped zinc selenide, $Ni^{2+}$-doped zinc sulfide, $Ni^{2+}$-doped zinc telluride, $Ni^{2+}$-doped cadmium selenide, $Ni^{2+}$-doped cadmium sulfide, $Ni^{2+}$-doped cadmium telluride, $Ag^{2+}$-doped zinc selenide. $Ag^{2+}$-doped zinc sulfide, $Ag^{2+}$-doped zinc telluride, $Ag^{2+}$-doped cadmium selenide, $Ag^{2+}$-doped cadmium sulfide, $Ag^{2+}$-doped cadmium telluride, $Cu^{2+}$-doped indium phosphide, $Cu^{2+}$-doped indium arsenide, $Ag^{2+}$-doped indium phosphide. $Ag^{2+}$-doped indium arsenide, $Mn^{2+}$-doped indium phosphide and $Mn^{2+}$-doped indium arsenide.

According to the preparation method of the invention, a rare-earth-doped upconversion nanocrystal may be prepared. The nanocrystal generates a fluorescent light through the upconversion process of the nanopartide. In a preferred embodiment, the nanocrystal includes a rare-earth-doped $NaYF_4$ nanocrystal, and the rare earth element includes at least one of the following elements: ytterbium, erbium, thulium, holmium, cerium, neodymium, gadolinium, samarium and europium, in a preferred embodiment, the nanocrystal is a rare-earth doped upconversion nanocrystal having a core-shell structure.

The preparation method of the invention is applicable to preparing all the nanocrystals for which precursors in a gaseous state are necessary to take part in reactions.

The nanocrystal prepared by the preparation method according to the invention may be further used to manufacture a display device. The display device includes a display panel, and a backlight module including a quantum dot film. The quantum dot film includes a luminous nanocrystal prepared according to the invention.

The nanocrystal prepared by the preparation method according to the invention may be further used to manufacture a lighting device. The lighting device includes a light source, and a quantum dot membrane including a luminous nanocrystal prepared according to the invention.

The nanocrystal prepared by the preparation method according to the invention may be further used to form an anti-counterfeit label. The anti-counterfeit label includes a luminous nanocrystal prepared according to the invention.

The present invention further discloses an apparatus for preparing and storing a gas-dissolved solution, including a storage unit and a tail gas absorber connected to the storage unit. The storage unit includes a low temperature circulating pump for providing a low temperature, a stirrer, a refrigerant, and a storage bottle containing a solvent for dissolving the gas. The stirrer is arranged in the storage bottle. The low temperature circulating pump includes a pump and a circulating line, in which the refrigerant is arranged. A part of the circulating line is arranged inside the storage bottle, and the other part of the circulating line is arranged outside the storage bottle. The refrigerant flows in the circulating line with the help of the pump to control the temperature in the storage bottle. Preferably, the tail gas absorber consists of a U-shaped tube containing an indicator and an absorption bottle containing an alkaline substance. The indicator indicates whether a gas exists, so that whether the gas is excessive is known.

The gas is supplied into the storage unit at a set temperature until saturation, and the excessive tail gas is absorbed by the tail absorber to avoid pollution.

In a preferred embodiment, the apparatus for preparing and storing a gas-dissolved solution further includes a gas treatment device connected to the storage unit. The gas treatment device is used to remove water or remove oxygen or both. The gas treatment device includes a drying tube containing a drying agent.

In a preferred embodiment, the apparatus for preparing and storing a gas-dissolved solution further includes a gas preparation device connected to the gas treatment device.

Example 1

A first precursor solution was prepared with hydrogen phosphide as a first precursor and with 1-octadecene (ODE for short) as a first selected solvent. The preparation method was performed as follows. 16 g of calcium phosphide ($Ca_3P_2$) was added into a 100 ml two-necked flask, and 40 ml hydrochloric acid at a concentration of 6 M was slowly injected therein by an automatic injection pump. The generated hydrogen phosphide gas was supplied into a drying tube, and then into a storage unit containing 10 ml of ODE at a temperature of 18° C. after removing water and oxygen. The storage unit includes a low temperature circulating pump for providing a low temperature, a stirrer, a refrigerant, and a storage bottle containing a solvent for dissolving the gas. The ODE was contained in the storage bottle. The storage unit was connected to a tail gas treatment device with a hydrogen phosphide indicator, e.g., copper sulfate, and the tail gas treatment device contained a sodium hydroxide solution. When the indicator in the tail gas treatment device showed that an ODE solution of hydrogen phosphide was saturated, addition of the hydrochloric acid into the two-necked flask was stopped. An ODE solution of hydrogen phosphide was obtained as a first precursor solution A1. Solution A1 was kept in the storage bottle of the storage unit for late use.

Example 2

A first precursor solution was prepared with hydrogen phosphide as a first precursor and with 1-hexadecene as a first selected solvent. The preparation method was the same as that in Example 1, except that the storage bottle of the storage unit contained 10 ml of 1-hexadecene at a temperature of 5° C. A hexadecene solution of hydrogen phosphide was obtained as a first precursor solution A2. Solution A2 was kept in the storage bottle of the storage unit for late use.

Example 3

A first precursor solution was prepared with hydrogen phosphide as a first precursor and with oleylamine as a first selected solvent. The preparation method was the same as that in Example 1, except that the storage bottle of the storage unit contained 10 ml of oleylamine at a temperature of 18° C. An oleylamine solution of hydrogen phosphide was obtained as a first precursor solution A3. Solution A3 was kept in the storage bottle of the storage unit for late use.

Example 4

A first precursor solution was prepared with hydrogen phosphide as a first precursor and with octylamine as a first selected solvent. The preparation method was the same as that in Example 1, except that the storage bottle of the storage unit contained 10 ml of octylamine at a temperature of 0° C. An octylamine solution of hydrogen phosphide was obtained as a first precursor solution A4. Solution A4 was kept in the storage bottle of the storage unit for late use.

Example 5

A first precursor solution was prepared with hydrogen sulfide as a first precursor and with ODE as a first selected solvent. The preparation method was the same as that in Example 1, except that hydrogen sulfide ($H_2S$) gas was generated through a reaction between $Na_2S$ and HCl solution under the protection of argon gas. An ODE solution of hydrogen sulfide was obtained as a first precursor solution A5. A5 was kept in the storage bottle of the storage unit for late use. Solution A5 was titrated with an alcoholic solution of silver nitrate ($AgNO_3$), with a concentration of 0.2 M.

Example 6

A first precursor solution was prepared with hydrogen sulfide as a first precursor and with 1-hexadecene as a first selected solvent. The preparation method was the same as that in Example 5, except that the storage bottle of the storage unit contained 10 ml of 1-hexadecene at a temperature of 5° C. A1-hexadecene solution of hydrogen sulfide was obtained as a first precursor solution A6. Solution A6 was kept in the storage bottle of the storage unit for late use.

Example 7

A preparation method of a $Mn^{2+}$-doped ZnS nanocrystal ($Zn—Mn^{2+}$) having a core-shell structure includes the following steps: adding 6 ml of a solvent ODE and 0.67 g of octadecylamine into a three-necked round-bottomed flask, adding 100 mg of zinc acetate and 125 mg of manganese acetate into the flask, vacuumizing the flask and supplying argon gas into the flask, and repeating the steps for many times, to form an inert gas atmosphere with water and oxygen removed; heating the flask to 220° C., injecting, with stirring, 10 ml of solution A5 prepared in Example 5 by a syringe below the liquid level of a second precursor solution; gradually raising the reaction temperature to 240° C., and injecting 5 ml of an ODE/oleic acid solution of zinc stearate at a concentration of 0.2 M; injecting 6 ml of solution A5 below the liquid level; further injecting 10 ml of a 0.1 M zinc sulfide precursor by an automatic injection pump at an injection rate of 2 ml/h; and 24 hours later, obtaining a nanocrystal-dispersed liquid.

Example 8

A preparation method of a nanocrystal (InP/ZnS for short) having a core-shell structure with indium phosphide as the core and with zinc sulfide as the shell includes the following steps: adding 8 ml of a solvent ODE and 77 mg of palmitoleic acid into a three-necked round-bottomed flask; adding 36.8 mg of zinc acetate and 58.2 mg of indium acetate into the flask; gradually heating the flask to 210° C. under the protection of argon gas, and keeping at the temperature for 30 minutes; injecting, with stirring, 6 ml of solution A1 prepared in Example 1 by an automatic injection pump below the liquid level of a second precursor solution in 6 times (no more than 2 ml each time) at an injection rate of 2 ml/h; further injecting 4 ml of a 0.1 M zinc sulfide precursor by an automatic injection pump at an injection rate of 2 ml/h and another 12 hours later, obtaining a nanocrystal.

Example 9

A preparation method of a nanocrystal having a core-shell structure with indium phosphide as the core and with zinc sulfide as the shell includes the following steps: adding 4 ml of a solvent ODE and 2.93 mg of oleic acid into a three-necked round-bottomed flask; adding 36.8 mg of zinc acetate and 29.4 mg of indium acetate into the flask; gradually heating the flask to 210 under the protection of argon gas; injecting 1 ml of a $PH_3$/ODE solution by an automatic injection pump below the liquid level of a second precursor solution at an injection rate of 2 ml/h; further injecting 4 ml of a 0.1 M zinc sulfide precursor by a mechanical pump at an injection rate of 2 ml/h; and another 16 hours later, obtaining a nanocrystal.

Example 10

A preparation method of a nanocrystal having a core-shell structure with indium phosphide as the core and with zinc sulfide as the shell includes the following steps: adding 1 mM of indium acetate, 1 mM of tetradecanoic acid and 10 ml of ODE into a three-necked round-bottomed flask, heating the flask to 120° C., vacuumizing the flask by a vacuum pump, supplying argon gas into the flask, repeating the steps for many times, keeping the flask under these conditions for 1 hour, and obtaining an indium precursor at a concentration of 0.1 M; adding 5 mM of zinc acetate, 5 mM of oleic acid and 10 ml of ODE into another three-necked round-bottomed flask, heating the flask to 120° C., vacuumizing the flask by a vacuum pump, supplying argon gas into the flask, repeating the steps for many times, keeping the flask wider these conditions for 1 hour, and obtaining a zinc precursor at a concentration of 0.5 M; and adding 1 ml of an indium precursor, 1 ml of a zinc precursor, 0.5 ml of oleylamine and 3 ml of ODE into another three-necked round-bottomed flask, heating the flask to 120° C., vacuumizing the flask by a vacuum pump, supplying argon gas into the flask, repeating the steps for many times, keeping the flask under these conditions for 20 minutes; further heating the flask to 250° C., quickly injecting, with stirring, 0.2 ml of the A1 solution prepared in example 1 below the liquid level, stirring for 10 minutes, further heating the flask to 300° C., adding 1 ml of dodecylthiol dropwise, keeping the flask at 300° C. for 30 minutes, cooling the flask to room temperature, and obtaining a nanocrystal-dispersed liquid. The dispersed liquid was centrifuged and washed with an organic solvent. Finally, the nanocrystal was redispersed in the organic solvent.

Example 11

A preparation method of a nanocrystal having a core-shell structure with indium phosphide as the core and with zinc sulfide as the shell includes the same preparation steps as the preparation steps in Example 10, except that after 0.2 ml of solution A1 prepared in Example 1 was injected, 1 ml of dodecylthiol was immediately added quickly, and the flask is further heated to 300° C., keeping the flask at 300° C. for 30 minutes, and cooling the flask to room temperature.

Example 12

A preparation method of a nanocrystal having a core-shell structure with indium phosphide as the core and with zinc sulfide as the shell includes the same preparation steps as the preparation steps in Example 10, except that 0.2 ml of solution A3 prepared in Example 3 was injected below the liquid level.

Example 13

A preparation method of a nanocrystal having a core-shell structure with indium phosphide as the core and with zinc sulfide as the shell is different from Example 10 in the following preparation steps: adding 1 ml of an indium precursor, 1 ml of a zinc precursor, 0.5 ml of oleylamine and 3 ml of ODE into another three-necked round-bottomed flask, heating the flask to 120° C., vacuumizing the flask by a vacuum pump, supplying argon gas into the flask, repeating the steps for many times, keeping the flask under these conditions for 20 minutes, further heating the flask to 240° C., quickly injecting, with stirring, 0.2 ml of solution 43 below the liquid level, stirring for 10 minutes, adding 1 ml of dodecylthiol dropwise, heating the flask to 260° C., adding 0.5 ml of a zinc precursor dropwise, keeping the flask at 260° C. for 10 minutes, adding 0.5 ml of dodecylthiol dropwise, keeping the flask at 260° C. for 10 minutes, further heating the flask to 280° C., adding 0.5 ml of a zinc precursor dropwise, keeping the flask at 280° C. for 10 minutes, further heating the flask to 300° C., keeping the flask at 300° C. for 30 minutes, cooling the flask to room temperature, and obtaining a nanocrystal-dispersed liquid. The dispersed liquid was centrifuged in the presence of an organic solvent, and washed with the organic solvent. Finally, the nanocrystal was redispersed in the organic solvent.

Example 14

A preparation method of a nanocrystal having a core-shell structure with indium phosphide as the core and with zinc sulfide as the shell includes the following steps: adding 30 mg of indium acetate, 20 mg of zinc acetate, 120 mg of oleic acid and 8 ml of ODE into a 50 ml three-necked flask, vacuumizing the flask, heating the flask to 110° C.-130° C., and keeping the flask at the temperature for 1 hour; supplying argon gas to the three-necked flask; injecting, at 230° C., 0.2 ml of solution A3 below the liquid level, and then injecting 0.2 ml of tributyl phosphate below the liquid level; keeping the flask at 230° C. for 10 minutes, and then cooling to 200° C.; further injecting 1.5 nil of solution A1 into the three-necked flask at in injection rate of 2 ml/h; heating the flask to 230° C., adding 8 ml of a zinc sulfide precursor solution every 30 minutes for 3 times in total, and then keeping the precursor solution at 190° C. for 12 hours. The reaction solution was centrifuged, and washed and purified with acetone twice. Finally, the nanocrystal was redispersed in the organic solvent.

Example 15

A preparation method of a copper indium sulfide (CuInS$_2$) nanoparticle includes the following steps: adding 29 mg of indium acetate, 19 mg of copper iodide, 340 mg of octadecylamine and 8 ml of ODE into a 50 ml three-necked flask, vacuumizing the flask, heating the flask to 110° C., and keeping the flask at the temperature for 1 hour; supplying argon gas to the three-necked flask; injecting 0.3 ml of solution A5 below the liquid level at 110° C., placing the reaction vessel in dark, heating the flask to 180° C., then adding 1 ml of solution A5 every 20 minutes for 3 times in total, keeping the reaction solution at 180° C. for 4 hours, and obtaining a copper indium sulfide nanoparticle-dispersed liquid. The dispersed liquid was centrifuged and washed with an organic solvent. Finally, the precipitate was redispersed in the organic solvent.

Test Results

Figure 2:
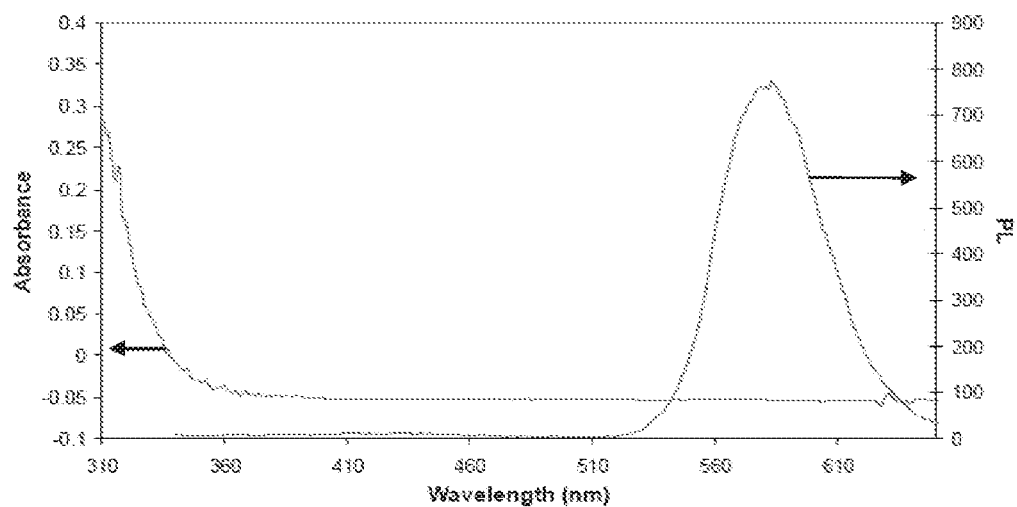
FIG. 2 is a UV-visible absorption spectrum (ABS) and a photoluminescence (PL, excitated at 330 nm) spectrum of a nanocrystal according to Example 7.

FIG. 2 is a UV-visible absorption spectrum (ABS) and a photoluminescence (PL, excitated at 330 nm) spectrum of a Mn$^{2+}$-doped ZnS nanocrystal having a core-shell structure synthesized according to Example 7. As can be seen from the figure, the nanocrystal according to Example 7 has an emission peak at 580 nm, and a peak width at half height of about 30 nm. The nanocrystal prepared according to the example has a quantum yield of as high as 32% without red shift. Thus, the ZnS—Mn$^{2+}$ nanocrystal particle prepared according to the invention has uniform volume distribution.

Figure 3:
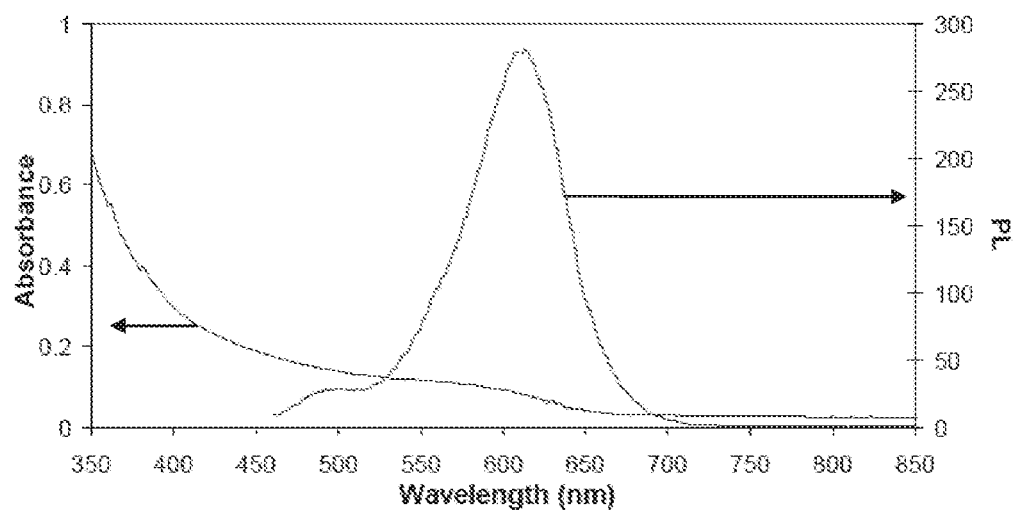
FIG. 3 is a UV-visible absorption spectrum (ABS) and a photoluminescence (PL, excitated at 450 nm) spectrum of a nanocrystal according to Example 8.

FIG. 3 is a UV-visible absorption spectrum (ABS) and a photoluminescence (PL, excitated at 450 nm) spectrum of a nanocrystal having a core-shell structure with indium phosphide as the core and with zinc sulfide as the shell synthesized according to Example 8. As can be seen from the figure, the nanocrystal according to Example 8 has an emission peak at 615 nm, and a peak width at half height of about 60 nm. The nanocrystal prepared according to the example has a quantum yield of as high as 33%. Thus, the InP/ZnS nanocrystal particle prepared according to the invention has uniform volume distribution.

Figure 4:
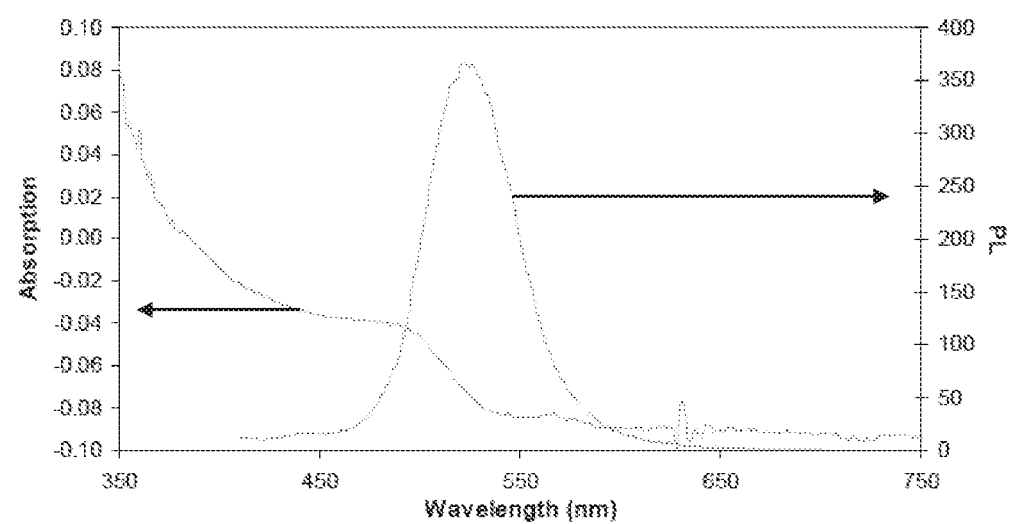
FIG. 4 is a UV-visible absorption spectrum (ABS) and a photoluminescence (PL, excitated at 450 nm) spectrum of a nanocrystal according to Example 9.

FIG. 4 is a UV-visible absorption spectrum (ABS) and a photoluminescence (PL, excitated at 450 nm) spectrum of a nanocrystal synthesized according to Example 9. The nanocrystal synthesized according to Example 9 emits green light. As can be seen from the future, the nanocrystal according to Example 9 has an emission peak at 523 nm, and a peak width at half height of about 50 nm. The nanocrystal prepared according to the example has a quantum yield of as high as 10%.

Examples 8 and 9 show that by controlling the amount of the added first precursor in a gaseous state, the ratio of the first precursor to the second precursor can be adjusted to prepare nanocrystals having different emission peaks. According to the method of the present invention, a nanocrystal having a core-shell structure with indium phosphide as the core and with zinc sulfide as the shell and having an emission peak at 480 nm to 750 nm may be prepared.

Figure 5:
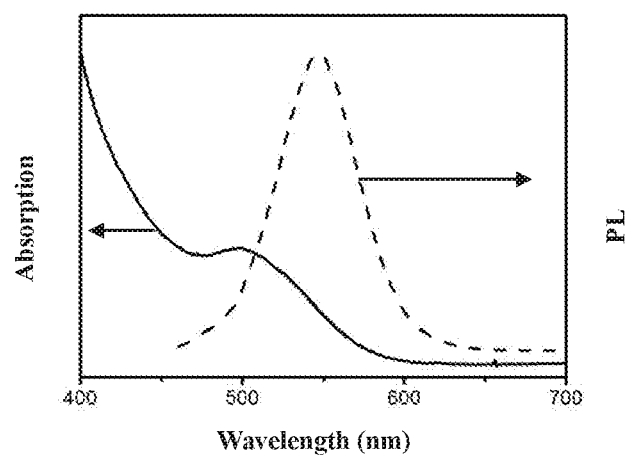
FIG. 5 is a UV-visible absorption spectrum (ABS) and a photoluminescence (PL, excitated at 450 nm) spectrum of a nanocrystal according to Example 10.
Figure 6:
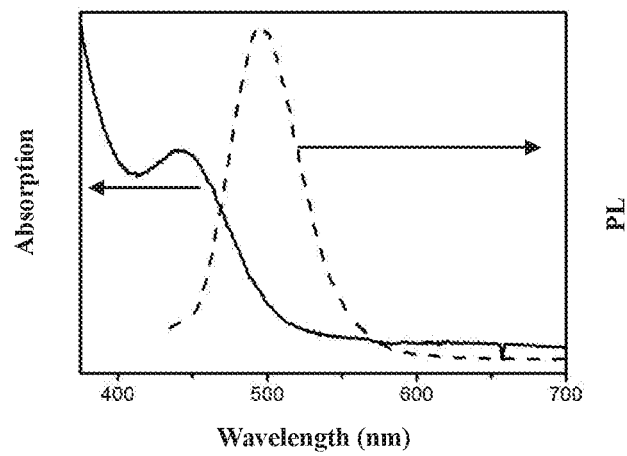
FIG. 6 is a UV-visible absorption spectrum (ABS) and a photoluminescence (PL, excitated at 450 nm) spectrum of a nanocrystal according to Example 11.
Figure 7:
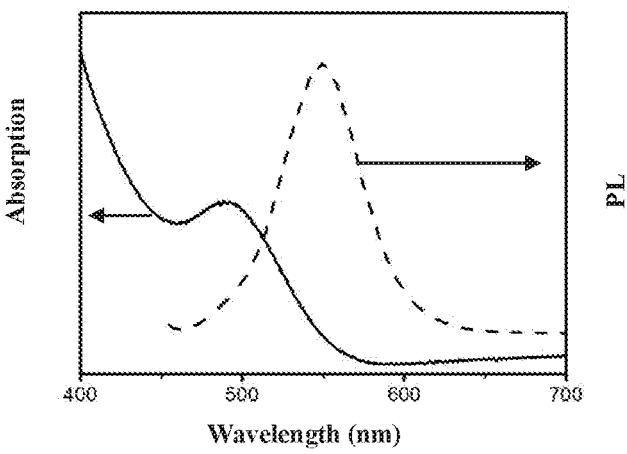
FIG. 7 is a UV-visible absorption spectrum (ABS) and a photoluminescence (PL, excitated at 450 nm) spectrum of a nanocrystal according to Example 12.
Figure 8:
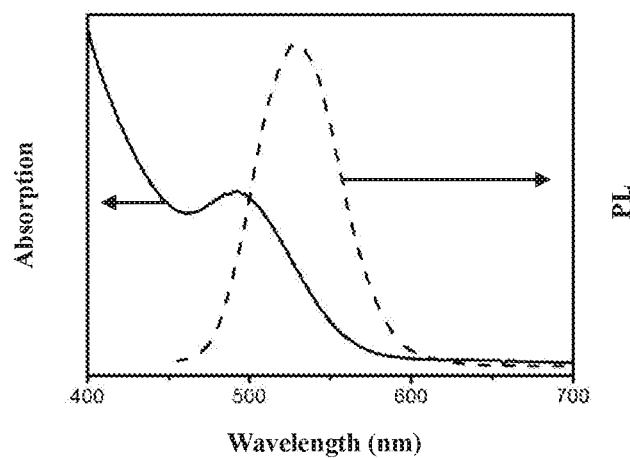
FIG. 8 is a UV-visible absorption spectrum (ABS) and a photoluminescence (PL, excitated at 450 nm) spectrum of a nanocrystal according to Example 13.

Compared with Example 10, the indium phosphide in Example 11 has a short growth time, and thus has a small growth size, and the obtained nanocrystal has a short emission wavelength. As shown in FIG. 5, the indium phosphide nanocrystal prepared according to Example 10 has an emission peak at a wavelength of 550 nm, and a peak width at half height of about 60 nm. As shown in FIG. 6, the indium phosphide nanocrystal prepared according to Example 11 has an emission peak at a wavelength of 500 nm, and a peak width at half height of about 50 nm. Compared with Examples 10-11, an oleylamine solution of hydrogen phosphide was used in Example 12. The oleylamine itself has an effect of promoting the nanocrystal formation reaction, so that the nanocrvstal formation reaction may occur at a low temperature of 240° C. As shown in FIG. 7, the indium phosphide nanocrystal prepared according to Example 12 has an emission peak at a wavelength of 550 nm, and a peak width at half height of about 60 nm. The nanocrvstal prepared according to Example 13 has finer zinc sulfide with fewer defects in the shell layer. As shown in FIG. 8, the indium phosphide nanocrystal prepared according to Example 10 has an emission peak at a wavelength of 540 nm, and a peak width at half height of about 60 nm.

The InP/ZnS nanocrystal prepared according to Example 14 has an emission peak at 570 nm, a luminescent quantum yield of as high as 53%, and a peak width at half height of about 59 nm.

Figure 9:
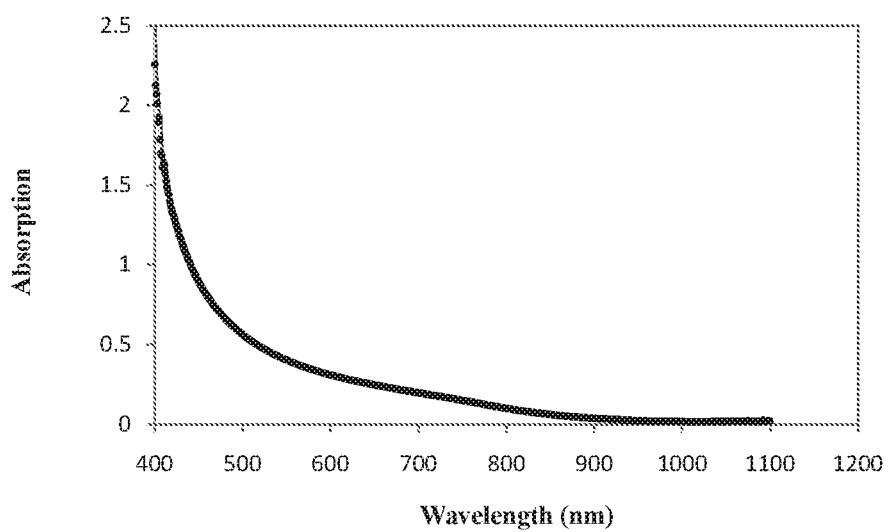
FIG. 9 is a UV-visible absorption spectrum (ABS) of a nanocrystal according to Example 15.

FIG. 9 is a UV-visible absorption spectrum (ABS) of a copper indium sulfide nanocrystal synthesized according to Example 15. As can be seen from the figure, the copper indium sulfide nanocrystal synthesized according to Example 15 has an absorption peak at about 700 nm.

In conclusion, as indicated by the data in the above examples, with the preparation method according to the invention, the addition amount and addition rate of the gas precursor may be controlled to better regulate the nanocrystal growth and prepare a nanocrystal having a controllable emission wavelength. Moreover, the nanocrystal prepared according to the invention has uniform volume distribution and a small peak width at half height, and will have no or little red shift phenomenon.

While the technical solutions of the present invention have been illustrated and enumerated in detail, it should be understood that it is apparent for those skilled in the art to modify and/or after the examples or use equivalent alternative solutions without departing from the essence of spirit of the present invention. The terms arising in the present invention are used for illustrating and understanding the present invention, instead of limiting the present invention.

The invention claimed is:

1. A method for preparing nanocrystals, comprising the following steps:
    dissolving, in a first selected solvent, a first precursor which is in a gaseous state under normal temperature and normal pressure, to form a first precursor solution, wherein the first selected solvent has a melting point of lower than 25° C., and a boiling point of higher than 150° C. and when the first precursor is dissolved in the first selected solvent, a temperature of the first selected solvent is set to a value in a range of from 0 to 5° C. from a melting point of the first selected solvent;
    dissolving a second precursor in a second selected solvent to form a second precursor solution, wherein the second precursor is a precursor of a metal element of Group I, Group II, Group III, or Group IV; and
    adding, in an inert gas atmosphere, the first precursor solution into a reaction vessel which contains the second precursor solution, wherein the first precursor chemically reacts with the second precursor to generate a nanocrystal;
    wherein when the first precursor solution is added into the second precursor solution, the second precursor solution is in a temperature range of 50-300° C., and after the first precursor solution is added into the second precursor solution, the mixture solution of the first precursor solution and the second precursor solution is maintained at a temperature range of 150-350° C. for a time range of 1 minute to 1 week.

2. The method according to claim 1, wherein dissolving the first precursor in the first selected solvent results in a physical change of the first precursor from a gas to a liquid.

3. The method according to claim 1, wherein the first precursor solution is injected below a liquid level of the second precursor solution at a preset rate.

4. The method according to claim 1, wherein the second precursor solution further comprises a surfactant, which comprises at least one of the following substances: trialkylphosphine, trialkylphosphine oxide, alkylamine, enamine, alkylthiol, arylthiol, alkylarylthiol, and fatty acid.

5. The method according to claim 4, wherein the alkylamine is at least one of monosubstituted alkylamine, disubstituted alkylamine, and trisubstituted alkylamine, and the fatty acid is at least one of tetradecanoic acid, oleic acid, and stearic acid.

6. The method according to claim 1, wherein the first precursor comprises at least one of the following substances: hydrogen sulfide, hydrogen selenide, hydrogen telluride, ammonia gas, hydrogen phosphide, hydrogen arsenide, and hydrogen antimonide.

7. The method according to claim 1, wherein the second precursor comprises at least one of the following substances: metal alkyl, metal oxide, metal halide, metal carboxylate, metal phosphonate, metal phosphinate, metal phosphate, metal sulfonate, and metal borate.

8. The method according to claim 1, wherein the first selected solvent and the second selected solvent respectively comprise at least one of the following substances: long-chain alkane, long-chain alkene, long-chain alcohol, long-chain amine, long-chain ester, long-chain fatty acid, long-chain thiol, trialkylphosphine, trialkylphosphine oxide, water, and water solution.

9. The method according to claim 8, wherein the long-chain alkane comprises at least one of the following substances: 1-octadecane, 1-heptadecane, 1-hexadecane, 1-dodecane, 1-tetradecane, 1-tridecane, 1-pristane, 1-phytane, 1-pentadecane, paraffin, 1-eicosane, 1-octacosane, and 1-tetracosane;
    the long-chain alkene comprises at least one of the following substances: 1-octadecene, 1-dodecylene, 1-hexadecene, 1-tetradecene, 1-heptadecene, 1-nonadecene, 1-eicosylene, 1-tridecylene, and 1-pentadecene;
    the long-chain alkylamine comprises at least one of the following substances: hexadecylamine, octadecylamine, tetradecylamine, decylamine, dodecylamine, undecylamine, tridecylamine, 1,12-diaminododecane, 1,18-diaminooctadecane, 1,16-diaminohexadecane, 1,14-diaminotetradecylamine, and oleylamine;
    the long-chain alkanol comprises at least one of the following substances: 1-octadecanol, 1-hexadecanol, 1-eicosanol, 1-dodecanol, 1-tridecanol, 1-tetradecanol, 1-docosanol, 1-pentadecanol, 1-heptadecanol, 1-nonadecanol, and 1-eicosanol;
    the long-chain alkyl ester comprises at least one of the following substances: stearyl ester, dodecyl acetate, hexadecyl acetate, eicosyl acetate, pentadecyl ester, and heptadecyl ester;
    the long-chain alkyl fatty acid comprises at least one of the following substances: decanoic acid, undecanoic acid, dodecanoic acid, tridecanoic acid, tetradecanoic acid, pentadecanoic acid, hexadecanoic acid, heptadecanoic acid, stearic acid, and eicosanoic acid; and
    the long-chain alkylthiol comprises at least one of the following substances: 1-undecanethiol, 1-dodecanethiol, 1-tetradecanethiol, 1-pentadecanethiol, 1-hexadecanethiol, and 1-octadecanethiol.

10. The method according to claim 1, wherein the method further comprises a third precursor solution in which a third precursor is dissolved, and
    before or after the first precursor solution is added into the second precursor solution, the third precursor solution is added to the reaction vessel.

11. The method according to claim 10, wherein the third precursor can chemically react with the second precursor or the first precursor to generate a nanocrystal.

12. The method according to claim 10, wherein the third precursor can generate a nanocrystal in-situ.

13. The method according to claim 10, wherein the preparation method further comprises adding a fourth precursor solution, in which a fourth precursor is dissolved, to the reaction vessel, after the third precursor solution is added into the reaction vessel.

14. The method according to claim 10, wherein the first precursor is hydrogen phosphide, the second precursor is an indium precursor or a mixture of an indium precursor and a zinc precursor, and the third precursor is a sulfur precursor or a zinc sulfide precursor.

15. A nanocrystal prepared by the method according to claim 1.

16. The nanocrystal according to claim 15, wherein the nanocrystal comprises at least one of the following substances: a compound of Group II-Group VIA, a compound of Group IV-Group VIA, a compound of Group III-Group VA, a compound of Group I-Group VIA, copper indium sulfide, and copper indium selenide;

the compound of Group II-Group VIA comprises: zinc selenide, zinc telluride, zinc sulfide, cadmium selenide, cadmium sulfide, cadmium telluride, zinc oxide, mercuric sulfide, mercuric telluride, magnesium oxide, magnesium sulfide, magnesium telluride, cadmium sulfoselenide, cadmium sulfotelluride, zinc sulfoselenide, zinc sulfotelluride, zinc selenotelluride, mercuric sulfoselenide, mercuric sulfotelluride, mercuric selenotelluride, cadmium zinc selenide, cadmium zinc sulfide, cadmium zinc telluride, cadmium mercury sulfide, cadmium zinc selenotelluride, cadmium zinc sulfotelluride, cadmium zinc sulfoselenide, cadmium mercury sulfotelluride, cadmium mercury sulfoselenide, cadmium mercury selenotelluride, zinc mercury sulfotelluride, zinc mercury sulfoselenide, zinc mercury selenotelluride, zinc magnesium sulfide, zinc magnesium telluride, zinc magnesium selenide, zinc magnesium oxide, zinc magnesium oxysulfide, zinc magnesium sulfoselenide, zinc magnesium telluroselenide, and zinc magnesium sulfotelluride;

the compound of Group IV-Group VIA comprises: lead sulfide, lead selenide, lead telluride, tin sulfide, tin selenide, tin telluride, tin sulfotelluride, tin sulfoselenide, tin selenotelluride, lead sulfotelluride, lead sulfoselenide, lead selenotelluride, lead tin sulfide, lead tin telluride, lead tin selenide, lead tin sulfoselenide, and lead tin sulfotelluride;

the compound of Group III-Group VA comprises: indium phosphide, indium arsenide, gallium nitride, gallium phosphide, gallium arsenide, gallium antimonide, aluminum nitride, aluminium phosphide, aluminium arsenide, aluminum antimonide, indium nitride, indium antimonide, gallium phosphide nitride, gallium arsenide nitride, gallium antimonide nitride, gallium antimonide phosphide, gallium arsenide phosphide, aluminium phosphide nitride, aluminum arsenide nitride, gallium aluminum phosphide nitride, gallium aluminum antimonide nitride, gallium aluminum antimonide phosphide, gallium aluminum arsenide phosphide, gallium indium phosphide nitride, gallium indium arsenide nitride, gallium indium antimonide nitride, gallium indium antimonide phosphide, gallium indium arsenide phosphide, aluminum indium nitride, aluminum indium phosphide, aluminum indium arsenide, and aluminum indium antimonide; and the compound of Group I-Group VI comprises: copper sulfide, copper telluride, copper selenide, silver sulfide, silver selenide, and silver telluride.

17. The nanocrystal according to claim 15, wherein the nanocrystal is a semiconductor nanocrystal chemically doped with one or more transition metal cations, and the nanocrystal comprises at least one of the following substances: $Mn^{2+}$-doped zinc selenide, $Mn^{2+}$-doped zinc sulfide, $Mn^{2+}$-doped zinc telluride, $Mn^{2+}$-doped cadmium selenide, $Mn^{2+}$-doped cadmium sulfide, $Mn^{2+}$-doped cadmium telluride, $Mn^{2+}$-doped zinc selenide, $Mn^{2+}$-doped zinc sulfide, $Mn^{2+}$-doped zinc telluride, $Mn^{2+}$-doped cadmium selenide, $Mn^{2+}$-doped cadmium sulfide, $Mn^{2+}$-doped cadmium telluride, $Co^{2+}$-doped zinc selenide, $Co^{2+}$-doped zinc sulfide, $Co^{2+}$-doped zinc telluride, $Co^{2+}$-doped cadmium selenide, $Co^{2+}$-doped cadmium sulfide, $Co^{2+}$-doped cadmium telluride, $Ni^{2+}$-doped zinc selenide, $Ni^{2+}$-doped zinc sulfide, $Ni^{2+}$-doped zinc telluride, $Ni^{2+}$-doped cadmium selenide, $Ni^{2+}$-doped cadmium sulfide, $Ni^{2+}$-doped cadmium telluride, $Ag^{+}$-doped zinc selenide, $Ag^{+}$-doped zinc sulfide, $Ag^{+}$-doped zinc telluride, $Ag^{+}$-doped cadmium selenide, $Ag^{+}$-doped cadmium sulfide, $Ag^{+}$-doped cadmium telluride, $Cu^{+}$-doped indium phosphide, $Cu^{+}$-doped indium arsenide, $Ag^{+}$-doped indium phosphide, $Ag^{+}$-doped indium arsenide, $Mn^{2+}$-doped indium phosphide, and $Mn^{2+}$-doped indium arsenide.

18. The method according to claim 1, wherein water and oxygen is removed from the first selected solvent prior to dissolving the first precursor in the first selected solvent.

* * * * *